United States Patent [19]

Endico

[11] Patent Number: 5,104,670

[45] Date of Patent: Apr. 14, 1992

[54] METHOD OF MAKING A SEASONING DELIVERY SYSTEM

[76] Inventor: Felix Endico, 440 E. 86th St., New York, N.Y. 10028

[21] Appl. No.: 564,887

[22] Filed: Aug. 9, 1990

[51] Int. Cl.$^5$ ............................................. A23L 1/22
[52] U.S. Cl. ........................... 426/330.6; 426/602; 426/638
[58] Field of Search ............... 426/330.6, 602, 605, 426/638

[56] References Cited

U.S. PATENT DOCUMENTS

| | | | |
|---|---|---|---|
| 2,217,699 | 10/1940 | Musher | 426/605 |
| 2,221,957 | 11/1940 | Straub | 426/605 |
| 2,254,049 | 8/1941 | Schutte | 426/605 |
| 2,264,593 | 12/1941 | Schapiro | 426/605 |
| 2,781,270 | 2/1957 | Crawford | 426/605 |
| 2,885,292 | 5/1959 | Stapf | 426/602 |
| 2,910,368 | 10/1959 | Melnick | 426/605 |
| 2,944,906 | 7/1960 | Spitzer | 426/605 |
| 3,093,485 | 6/1963 | Partyka | 426/605 |
| 3,093,486 | 6/1963 | Krett | 426/605 |
| 3,189,464 | 6/1965 | Heinemann | 426/605 |
| 3,300,318 | 1/1967 | Szczesniak | 426/605 |
| 3,594,183 | 7/1971 | Melnick | 426/605 |
| 3,764,347 | 10/1973 | Katz | 426/602 |
| 3,955,010 | 5/1976 | Chozianin | 426/605 |
| 4,119,564 | 10/1978 | Van Dam | 426/605 |
| 4,140,808 | 2/1979 | Jonson | 426/605 |
| 4,145,451 | 3/1979 | Oles | 426/605 |
| 4,302,747 | 11/1981 | Mikami | 426/654 |
| 4,336,272 | 6/1982 | Verrips | 426/605 |
| 4,423,084 | 12/1983 | Trainor | 426/605 |
| 4,426,395 | 1/1984 | Sakai | 426/605 |
| 4,650,690 | 3/1987 | Bams | 426/605 |
| 4,762,726 | 8/1988 | Soucie | 426/330.6 |
| 4,923,707 | 5/1990 | Schoenberg | 426/605 |
| 4,948,617 | 8/1990 | Dartey | 426/605 |

*Primary Examiner*—Carolyn Paden
*Attorney, Agent, or Firm*—Natter & Natter

[57] ABSTRACT

A seasoning delivery system for commercial salad processing utilizes an oil-in-water emulsion containing a consolidated seasoning component. The process of manufacture involves formation of a mayonnaise-like slurry and the subsequent introduction of a plurality of ingredients including natural spices, a constituent of the seasoning component. The emulsion is recirculated through a colloid mill for homogeneously incorporating the seasoning component whereby the essential oils within the spices are released and uniformly distributed within the emulsion. The emulsion is prepared using standardized formulations and is calibrated for combination with predetermined quantities of food solids for producing a finished salad product with an enhanced flavor profile and uniform quality.

9 Claims, 2 Drawing Sheets

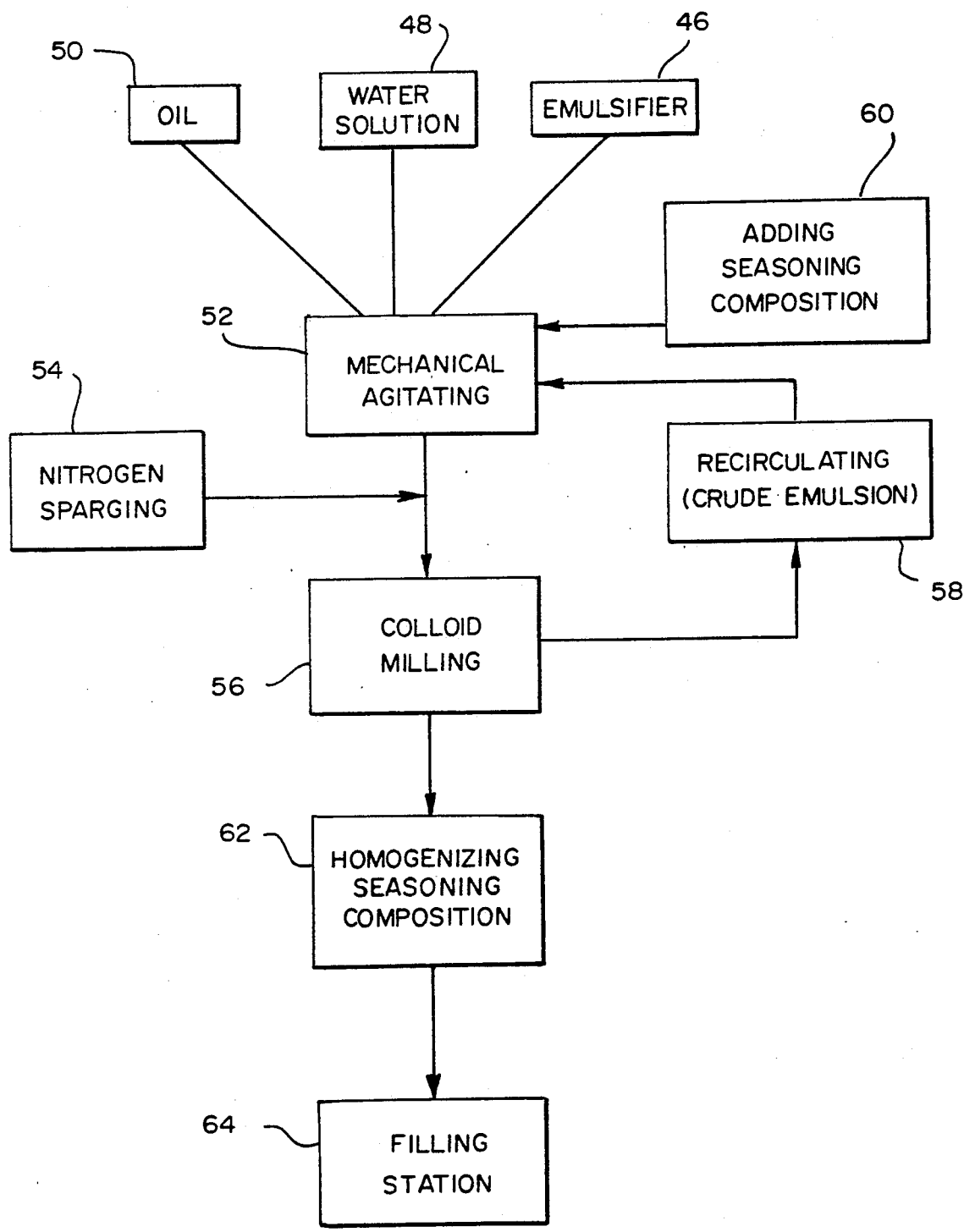

METHOD OF MAKING A SEASONING DELIVERY SYSTEM

1. TECHNICAL FIELD

This invention relates generally to institutional food service and especially to commercial salad preparation.

In particular, the seasoning delivery system of this invention concerns an aqueous emulsion and method for delivering a premeasured quantity of seasoning component to salad food solids.

2. BACKGROUND ART

Many high volume food service establishments such as restaurants, hotels, hospitals and similar institutional settings meet some food supply requirements with prepared foods such as salads. A problem with prepared salads is that it is difficult for the food establishments to control the consistency and the quantity of the finished products. Furthermore, prepared salads have a rather limited shelf life which necessitates a frequent delivery schedule and increased costs.

As an alternative commissaries and other commercial salad processors have utilized in-house operations for salad preparation. These facilities however, require the maintenance of inventories of salad food solids, spices, preservatives and other food additives. Other shortcomings of on-site preparation are that the procuring of the raw materials, assembling of the ingredients and mixing of the condiments require skilled personnel, is time consuming and is costly.

Another salad processing technique relies upon prepared dry spice blends which eliminate some of the assembly and mixing requirements of on-site preparation. The dry spice blends however, must be hydrated before incorporation into the salad food solids. An inherent deficiency with dry spice blends is that the spices are frequently subject to microbiological contamination. Another difficulty arises when attempting to effectively incorporate the hydrated spices into the salad food mix in order to achieve uniform flavor strength.

The development of "wet" seasoning blends obviates the necessity for hydrating the spices however, the effectiveness of these liquid blends depend primarily on spice oleoresins in suspension. If the spices are not evenly distributed in the suspension, the finished food product lacks consistency in flavor and quality.

An example of a liquid seasoning composition is disclosed in the patent to TODD (U.S. Pat. No. 4,343,823). The seasoning ingredients described in that patent include spice oleoresins that are dispersable in an oil or water suspension. A disadvantage of that composition is that the spice oils are not fully released and thoroughly distributed through the salad food solids. Similarly, a semisolid dressing of the TAKADA patent (U.S. Pat. No. 4,304,795) also relies upon a suspension carrier. A dry mix is discussed in the GOODMAN patent (U.S. Pat. No. 3,968,261) which when reconstituted provides an emulsion however, the emulsion is not utilized for transporting flavor ingredients.

BRIEF DESCRIPTION OF THE INVENTION

The nature of this invention concerns the application of emulsion technology and spice blending for providing an improved seasoning delivery system.

In summary, the seasoning delivery system of this invention is directed to a single consolidated charge of liquified seasoning component for in-situ commercial salad preparation. The seasoning component preferably includes a selection of natural spices, stabilizers, an acidulant and food intermediates that have been premeasured or otherwise calibrated in accordance with the nature of the finished food product. The delivery of a calibrated charge of seasoning component eliminates the need for measuring, weighing, or adding any other food adjuncts or condiments.

Another aspect of this invention is that the seasoning component is homogeneously distributed within an aqueous emulsion and is not subject to precipitation or sedimentation of the spice particulates or other additives. Therefore, the delivery system assures consistency in flavor and quality. The homogenization of the seasoning component within the aqueous emulsion also releases the volatile oils from within the natural spices so that the flavor will evenly permeate the salad food solids.

Additionally, the shelf life of the seasoning component is extended without refrigeration by the inclusion of an acidulant which inhibits bacterial growth within the spices.

The process for manufacturing the seasoning delivery system of this invention includes the steps of forming an oil-in-water emulsion utilizing in seriatim, mechanical agitation and colloidal milling. The ingredients of the seasoning component are introduced into the aqueous emulsion which is then recirculated through the colloidal milling stage for emulsifying the seasoning component ingredients.

Having thus summarized the invention, it will be seen that it is an object thereof, to provide a seasoning delivery system of the general character described herein which is not subject to the aforementioned disadvantages, shortcomings and deficiencies.

An object therefore of this invention is to provide a seasoning delivery system using an aqueous emulsion incorporating a blended charge of seasoning component for combination with a salad food mix.

Another object of this invention is to provide a seasoning delivery system wherein the seasoning component includes natural spices homogeneously dispersed within the aqueous emulsion.

A still further object of this invention is to provide a seasoning delivery system adapted for batch processing and custom blending for selected food mixes.

Yet another object of this invention is to provide a seasoning delivery system utilizing standardized formulations for flavor consistency and quality assurance within the finished product.

Still another object of this invention is to provide a seasoning delivery system which has a stable shelf life.

A still further object of this invention is to provide a seasoning delivery system which has practical application, is well adapted to meet the needs of commercial food processors and is cost effective.

With these ends in view, the invention finds embodiment in certain combinations of ingredients and procedures, by which the aforementioned objects and certain other objects are hereinafter attained, all as more fully described with reference to the accompanying drawings, and the scope of which is more particularly pointed out and indicated in the appended claims.

BRIEF DESCRIPTION OF THE DRAWINGS

In the accompanying drawings in which is shown an exemplary procedure for preparing a seasoning delivery system in accordance with this invention:

FIG. 2 is a flow chart showing the steps of the manufacturing process.

DETAILED DESCRIPTION OF THE INVENTION

Figure 1:
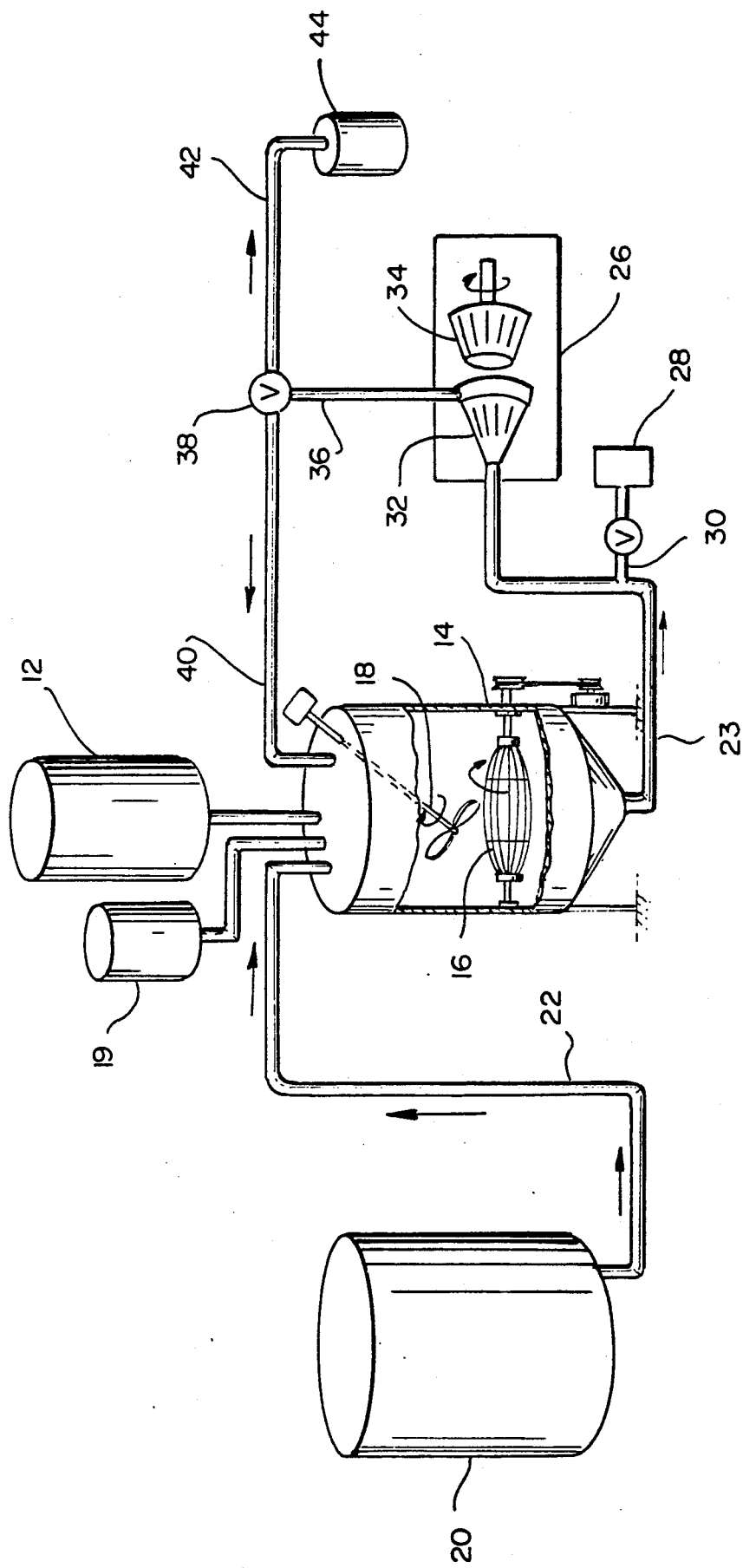
FIG. 1 is a schematic diagram illustrating the process of manufacturing a seasoning delivery system.

The seasoning delivery system of this invention will now be described with reference to the commercial preparation of salads utilizing food solids such as chicken, egg, shrimp, tuna and pasta. It should be understood however, that the delivery system has application for use with other food mixes and/or products. Furthermore, for the purpose of this description, the process for manufacturing the delivery system and its composition will be discussed with reference to an oil-in-water emulsion wherein the oil forms a discontinuous, dispersed or internal phase and the water forms a continuous, dispersing, or external phase.

Referring now to FIG. 1, there is schematically illustrated a procedure for the batch manufacture of an aqueous emulsion incorporating a seasoning component comprised of a plurality of condiments and other additives.

The initial stage of the procedure involves the formulation of a premix by adding a water solution from a holding tank 12 to a stationery stainless steel vessel or premix tank 14. The tank 14 preferably is a high sheer mixer such as manufactured by Hamilton Manufacturing Co., e.g. Model 316, stainless steel—120 gallon capacity. A horizontally mounted squirrel cage agitator 16 and a supplemental lightening mixer 18 provide mechanical agitation for the premix.

An emulsifying agent, preferably a naturally occurring emulsifier such as found in proteins, phospholipids or sterols is utilized in this process for reducing interfacial tension and for preventing the coalescence of droplets of the internal phase. The process does not rely upon a surfactant. The emulsifier is released from a container 19 for discharge into the premix tank 14.

A vegetable oil, such as soybean or canola oil, is stored within a holding tank 20. The tank 20, preferably includes a plate chiller and a recirculating system (not shown) for reducing the temperature of the oil. By way of illustration, the tank 20 has a 5000 lb. capacity and the temperature of the oil is preferably maintained at 40 to 45 degrees fahrenheit. This temperature range has been found to reduce the size of the oil particles and to lower the resultant interfacial tension between the immiscible liquids—oil and water.

The oil is gradually discharged from the tank 20 through a conduit 22 into the premix tank 14; the direction of flow being indicated by the arrows. Although the fluids of the system may flow by gravity feed, a fluid pump (not shown) is preferred for providing the motivating pressure.

The contents within the tank 14 are interspersed by the action of the squirrel cage agitator 16 and the lightening mixer 18 to achieve uniform distribution and to form a slurry or crude emulsion. The slurry is then pumped through a conduit 23 to a colloid mill 26. Intermediate the premix tank 14 and the colloid mill 26, a source of nitrogen gas 28 is introduced into the slurry through a valve controlled conduit 30. The purpose of the aforementioned nitrogen sparging is to purge the oxygen within the slurry. The reduction of entrained oxygen reduces rancidity and improves the texture and dispersability of the resultant product.

A milling station includes the colloidal mill 26, such as manufactured by Waukesha Foundry Inc. The colloidal mill 26 as schematically illustrated in FIG. 1, consists of a frustrum shaped stator 32 and a matching rotor 34 which turns on a horizontal axis. The tolerance between the stator 32 and the rotor 34 is adjustable and provides a clearance through which the slurry passes. By way of example, the clearance is set at "30" during this stage of the procedure. The slurry is introduced at the center of rotation, passes between the rotor 34 and the stator 32 and is discharged at the periphery through a conduit 36 whereby the slurry is subjected to shear and turbulence forces resulting in the dispersion of the internal phase. The flow of the slurry from the mill 26 is directed through the conduit 36 and is recirculated by valve 38 through a conduit 40 to the premix tank 14. The purpose of the recirculation is to provide a visual and/or instrumentational inspection of the slurry to determine when the emulsifying agent has been adsorbed at the interface to stabilize the emulsion. The slurry is thus recirculated until a stable mayonnaise-like emulsion has been formed.

The next phase of the process involves the introduction of the seasoning component. It should be understood that the seasoning component for each salad will vary and can be custom blended to meet the objectives of the desired finish food product.

The seasoning component is added to the slurry in the premix tank 14 and is then processed through the colloidal mill 26 however, the clearance between the stator 32 and the rotor 34 is reduced to a setting of "20". The slurry is similarly recirculated through the conduits 36, 40 to the premix tank 14. When it has been determined that the seasoning component has been completely emulsified or homogenized within the slurry, the valve 38 is actuated so as to direct the slurry through a conduit 42 to a filling station for discharge into containers such as indicated at 44. Preferably, the containers 44 are of one gallon and/or four gallon capacity.

The process of manufacture and the composition of the seasoning delivery system of this invention will be further discussed with reference to the flow chart of FIG. 2.

The initial step of the process includes the preparation of a premix which involves the addition of an emulsifying agent 46 to the external phase, a water solution 48, containing sugar, salt, spices, acidulant, stabilizer and modified food starch, and gradually adding the internal phase, an oil 50 such as canola oil. The combined ingredients can for example, be prepared in a 500 lb. batch mix and then subjected to mechanical agitation in the premix tank as indicated at 52.

The percentages of premix ingredients by weight, for providing a typical low calorie cholesterol-free product are set forth in Table 1; also included are the parameters or range of values for each ingredient.

TABLE 1

| Ingredients | Percentage by Weight | Range of Percentages By Weight |
|---|---|---|
| Oil (Canola, Soybean) | 52 | 10-80 |
| Emulsifying Agents | 6 | 2-10 |

TABLE 1-continued

| Ingredients | Percentage by Weight | Range of Percentages By Weight |
| --- | --- | --- |
| (Egg Whites) | | |
| Water | 35 | 12-36 |
| Modified Food Starch | 3 | .5-3 |
| Acidulant | .5 | .1-1.0 |
| (Vinegar) | | |
| Salt | .7 | .5-3 |
| Spices | .9 | .8-1 |
| Sugar | 1.6 | 1.5-2 |
| Stabilizer | .3 | .2-.3 |

The next step of the procedure is to purge the oxygen within slurry using nitrogen gas shown at 54. This removes the oxygen for enhancing shelf stability of the finished product. Subsequent thereto, the slurry is subjected to colloidal milling as shown at 56. The slurry is thereafter recirculated as denoted at 58 as a crude emulsion until the emulsion has stabilized. A seasoning component, comprised of the ingredients shown in Table 2, is then introduced into the slurry as indicated at 60.

TABLE 2

| Ingredients | Range of Percentages by Weight |
| --- | --- |
| Selected Natural Spices | 1-30 |
| (onion, garlic, pepper, salt) | |
| Water | 5-80 |
| Flavor Enhancer | 0-15 |
| (Hydrolyzed Vegetable | |
| Protein or Monosodium Glutamate) | |
| Stabilizers | .2-1 |
| (Combinations of Xanthan Gum, | |
| guar gum, and propylene glycol | |
| alginate) | |
| Acidulant | .3-1.2 |
| (Acetic or citric acid) | |
| Preservatives | .1-15 |
| (Potassium sorbate and | |
| sodium benzoate) | |
| Sequestering Agent | .05-.07 |
| (Tenox 6 manufactured by | |
| Eastman Kodak or calcium | |
| dissodium EDTA) | |
| Spice Oleoresins | .0-1 |

The slurry containing the seasoning component is then processed through the colloidal mill at 56 for homogenizing the seasoning component and for releasing the volatile oils from the natural spices as denoted at 62. Subsequent thereto, the seasoning emulsion is dispensed at a filling station 64 into containers.

By way of further explanation, exemplary formulations of the seasoning component for selected salad food solids are noted in Table 3.

TABLE 3

| Seasoning component constituents for selected food solids (percentage by weight) | | |
| --- | --- | --- |
| Ingredients | Tuna | Shrimp |
| Spices and | 25.20 | 20.0 |
| Spice Oleoresins | | |
| Water | 46.13 | 66.5 |
| Flavor Enhancer | 12.60 | 10.0 |
| Stabilizer | 1.00 | .5 |
| Acidulant | 0.00 | 0.0 |
| Preservatives | 15.00 | 3.0 |
| Sequestering Agent | .07 | 0.0 |

The seasoning component is preferably calibrated such that 8 lbs. of the homogenized seasoning emulsion can be packaged within a one gallon container and that one 8 lb. container can be used per 100 lbs. of salad food solids. The food solids can be flaked, cubed, diced or otherwise comminuted. The homogenized seasoning emulsion as delivered will be uniformly dispersed in the finished salad. It has been determined that the seasoning emulsion will have an average shelf life of between 3 to 6 months without refrigeration. Furthermore, by using standardized formulations for the premix and the seasoning component, flavor consistency and quality assurance within the finished food product can be readily controlled.

Thus, it will be seen that there is provided a seasoning delivery system which achieves the various features and objects of the present invention and which is well suited to meet the conditions of practical application.

As various modifications might be made in the invention above set forth, it is to be understood that all matter herein described or shown in the accompanying drawings is to be interpreted as illustrative and not in a limiting sense.

Having thus described the invention, there is claimed as new and desired to be secured by Letters Patent:

1. A process for manufacturing a seasoning delivery system comprising the steps of:
   (a) combining water, an emulsifier and oil to form a premix;
   (b) agitating the premix to form a slurry;
   (c) introducing nitrogen gas into the slurry to remove entrained oxygen;
   (d) milling the slurry to form an emulsion;
   (e) recirculating the emulsion until stabilized;
   (f) adding a selected seasoning component to the stabilized emulsion; and
   (g) homogenizing the seasoning component within the stabilized emulsion.

2. A process for manufacturing a seasoning delivery system in accordance with claim 1 wherein the water contains in solution an acidulant, salt, spices, sugar, modified food starch, and a stabilizer.

3. A process for manufacturing a seasoning delivery system in accordance with claim 1 wherein the emulsifying agent is a natural emulsifier.

4. A process for manufacturing a seasoning delivery system in accordance with claim 1 wherein the oil is canola oil.

5. A process for manufacturing a seasoning delivery system as claimed in claim 1 wherein the agitation of the premix is achieved using a high sheer mechanical mixing apparatus.

6. A process for manufacturing a seasoning delivery system as claimed in claim 1 wherein the slurry is sparged with nitrogen gas for removing entrained oxygen.

7. A process for manufacturing a seasoning delivery system in accordance with claim 1 wherein the slurry is milled within a colloid mill.

8. A seasoning delivery system in accordance with claim 1 wherein the seasoning component consists essentially of spices, an acidulant, a stabilizer, a sequestering agent and a preservative.

9. A process for manufacturing a seasoning delivery system in accordance with claim 1 wherein the oil is introduced into the premix at a temperature of approximately 40 to 45 degrees fahrenheit.

* * * * *